Aug. 12, 1969  J. KAYUHA, JR  3,461,424
PRESSURE CONTROLLED DEVICE FOR PRODUCING
VARYING FLASHING SIGNALS
Filed Oct. 10, 1966

INVENTOR.
JOSEPH KAYUHA, JR.
BY
Linton and Linton
ATTORNEYS.

United States Patent Office 3,461,424
Patented Aug. 12, 1969

3,461,424
PRESSURE CONTROLLED DEVICE FOR PRODUCING VARYING FLASHING SIGNALS
Joseph Kayuha, Jr., 33 Burkham Court,
Wheeling, W. Va. 26003
Filed Oct. 10, 1966, Ser. No. 585,686
Int. Cl. B60q 1/00, 3/00, 1/26
U.S. Cl. 340—60      4 Claims

ABSTRACT OF THE DISCLOSURE

The present device is controlled by pressure applied thereto and operates electrical signals in a flashing manner when the pressure is applied to the device and also varies the timing of the flashing signals in accordance with variations in the amount of the pressure applied to the device.

---

The present invention is concerned with a pressure controlled device for producing varying flashing signals for indicating when pressure is applied to the device as well as variations in the amount of the pressure.

The principal object of the present invention is to provide a device for operating electrical signals in a flashing manner when pressure is applied to the device and which device varies the timing of the flashing of the signals in coordination with the amount of pressure applied to the device from time to time.

Another important object of the present invention is to provide a device which can be readily connected to various types of pressure producing apparatus, as for example, hydraulic pressure systems, steam boilers, gas pressure chambers or other devices or systems for indicating increases or decreases in the pressure therein.

A still further and important object of the invention is to provide a device for connection to the hydraulic brake system and stop lights of a vehicle for intermittently transmitting varying amounts of current to the stop lights depending upon the amount of pressure applied to the brake pedal of such systems to cause the brake lights to flash in an increasingly faster manner as the pressure applied to the brake pedal increases and in a slower manner when the pressure on the brake pedal is small.

Figure 1:
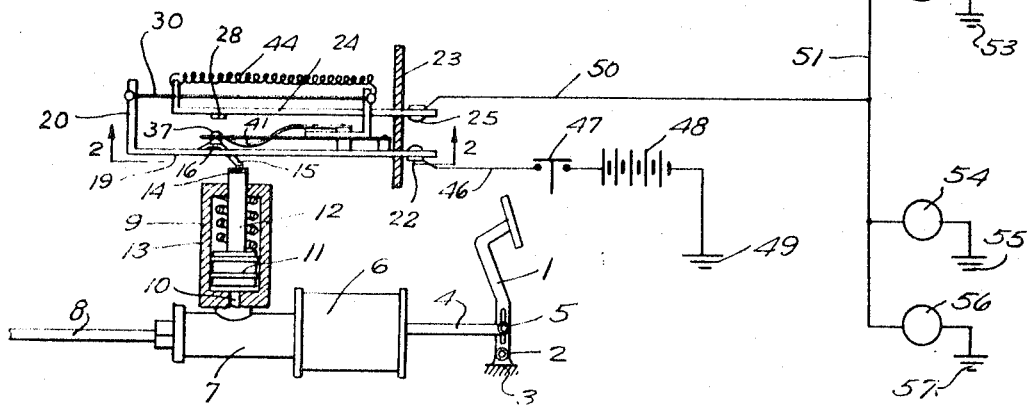
Figure 2:
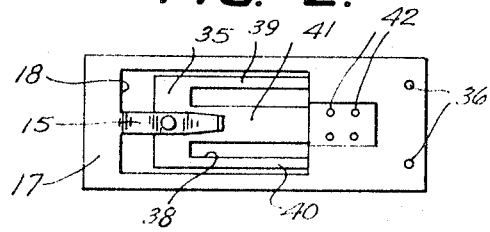
Figure 3:
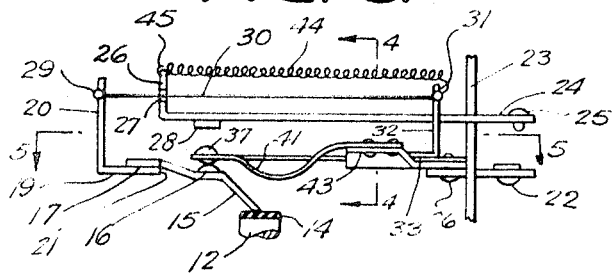
Figure 4:
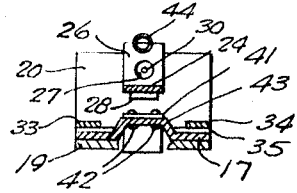
Figure 5:
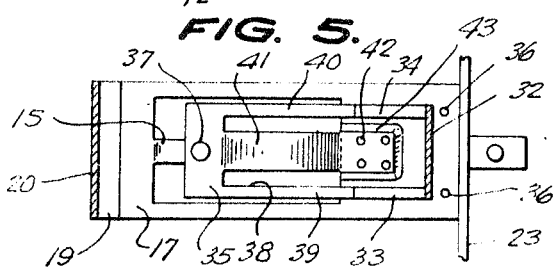

Further objects of the present invention will be in part obvious and in part pointed out in the following description of the accompanying drawings, in which;

FIG. 1 is a side elevation partly in section of the present invention connected to a hydraulic brake and stop light system of a vehicle, FIG. 2 is an enlarged view taken on line 2—2 of FIG. 1, FIG. 3 is a side elevation of the switching elements of the present device, FIG. 4 is a cross-sectional view taken on line 4—4 of FIG. 3, and FIG. 5 is a cross-sectional view taken on line 5—5 of FIG. 3.

In the drawings the present device is shown interconnected in a conventional hydraulic brake and stop light system of a vehicle for showing one use of the present device and is to be considered only as an example thereof. The present device can equally as well be employed in other systems or apparatus having a pressure therein or to which pressure is applied such as, for example, steam boilers, gas pressure chambers or the like.

Referring now more particularly to the accompanying drawings, wherein like and corresponding parts are indicated by similar reference characters, numeral 1 indicates a brake pedal pivoted at 2 to a portion 3 of a vehicle. Piston rod 4 is pivotally connected at 5 to said brake pedal and extends within the master cylinder 6 for operating a piston (not shown) therein. Said master cylinder includes a chamber 7 containing brake fluid and to which is connected a tube 8 extending to the hydraulic cylinders of the wheel brakes (not shown). These elements are conventional members of hydraulic brake systems as currently used on vehicles.

A cylinder 9 is fixedly mounted on chamber 7 by welding, screws, or the like and has a bottom port 10 in communication with the interior of chamber 7 for receiving brake fluid therefrom. A piston 11 is slideably positioned in cylinder 9 and has a piston rod 12 extending from cylinder 9. A coil spring 13 surrounds piston rod 12 and is positioned between piston 11 and the upper end of cylinder 9 tending to retain said piston at the bottom of cylinder 9 as shown in FIG. 1. An electrical insulating disc 14 is fixedly mounted by adhesive or the like to the outer end of piston rod 12.

A bent resilient tongue 15 has one end bearing on insulating disc 14, an electrical contact 16 fixedly mounted upon its upper medial face, while its other end is an integral part of a plate 17 of current conducting material. Said plate has an interior opening 18 through which tongue 15 extends downwardly below the plane of said plate.

An L-shaped support 19 of electrical conducting material has an upright end portion 20 and an interior opening 21 through which tongue 15 extends. The plate 17 is mounted upon support 19 and affixed at one end thereto by rivets 36.

Support 19 further has a connector post 22 and extends through an upright 23 which may be any upright portion of a vehicle, for example, of an electrical insulating material or may be an insulating plate attached to the vehicle.

An L-shaped arm 24 of an electrical current conducting material has a connector post 25 and likewise extends through the insulating upright 23 above support 19 and further has an upright end 26 with an opening 27 therethrough while an electrical contact 28 is fixedly attached to the bottom of said arm above contact point 16.

The upright end 20 of support 19 is electrically connected at 29 to a thermoexpansive resistance wire 30 which extends through opening 27 over to an insulator 31 carried by lever 32 so that said wire is normally stretched relatively tight between upright 20 and lever 32. Said lever 32 has a pair of feet 33 and 34 fixedly mounted on conductor plate 35 by welding, screws and the like at one end thereof. Said conductor plate 35 is of a metal heat expansive flexible current conducting material such as, for example, steel or a metal alloy. Said conductor plate 35 has a contact point 37 fixedly mounted thereon directly beneath contact point 28 and also has an interior opening 38 providing a pair of legs 39 and 40 which extend beneath feet 33 and 34 on plate 17 and also are connected to plate 17 by rivets 36. A bowed tongue 41 providing a leaf spring is integral with conductor plate 35 adjacent contact 37 and extends downwardly through opening 38 and then upwardly onto the top of a raised portion 43 of plate 17 and is affixed to said raised portion by rivets 42.

An electrical resistance wire 44 is electrically connected to upright end 26 at 45 and also to wire 30 around insulator 31. Wires 30 and 44 may be of a nickel alloy for example.

Wire 46 is connected to post 22 and has a brake pedal operated switch 47 innerconnected therein and is also connected to battery 48 which in turn is grounded at 49, for example, to the frame of a vehicle. Wire 50 is connected to post 25 and to wire 51 which in turn is connected to a plurality of electrical stop lights 52, 54, and 56 which are grounded at 53, 55, and 57 also, for example, to the frame of the vehicle. Said elements 46 to 57 are conventional parts of vehicles with switch 47 operatively linked to the brake pedal 1 by conventional means (not shown).

However, when the present device is used in other pressure containing systems or apparatus said elements would be added to the present device for signaling purposes.

In the operation of the apparatus hereinbefore described and shown in the drawings, when brake pedal 1 is pivoted to the left of FIG. 1 it pushes piston rod 4 inwardly of master cylinder 6 forcing brake fluid through tube 8 to the various brake cylinders of the vehicle for operating the brakes thereof. Said brake pedal 1 is pushed by an operator through varying arcs depending upon the amount of braking of the vehicle desired. When fluid is being forced by said brake pedal from the master cylinder some of the fluid goes into cylinder 9 through restricted port 10 tending to push piston 11 upwardly against spring 13 which tends to restrain the movement of piston rod 12. At the same time switch 47 is closed by pedal 1 whereupon current from battery 48 flows through wire 46, support 19, wire 30, wire 44, arm 24, and wire 50 to the lamps 52, 54, and 56.

Contact 16 is normally in contact with contact 37. The thermoexpansive wire 30 is under tension due to its fastening at 29 and 31 and thus maintains, through the lever 32, the normal contact of the points 16 and 37 as lever 32 pivots to the left of FIGS. 1 and 2 and by its feet 33 and 34 bears on the conductor plate 35 tending to push the same downwardly. Also spring 41 tends to push conductor plate 35 downwardly due to the bowed shape thereof and its connection by rivets 42 to plate 17.

When an operator presses on brake pedal 1, the resistance to the passage of current by the wires 30 and 44 causes said lamps to receive an insufficient amount of current to light the same. At the same time, wire 30 becomes heated due to its resistance to the current and expands lengthwise permitting lever 32 to pivot to the right of FIGS. 1 and 3 reducing the pressure on conductor plate 35 allowing contact 37 to move from contact 16 and make contact with contact 28 due to the resiliency of conductor plate 35 and spring 41. Thereby, the electrical current bypasses wires 30 and 44 and goes directly from arm 24 to the stop lights which thereby receive a full flow of current so that they will be brightly lighted. At the same time wire 30 becomes cool, contracts and moves lever 32 to the left of FIGS. 1 and 3 while conducting plate 35 is heated and expands as is spring 41 which moves contact 37 from contact 28 to contact 16. Thus due to the heating and cooling of wire 30 and conducting plate 35 the lights will be caused to go on and off producing a flashing of light therefrom.

When only a small amount of pressure is applied to brake pedal 1 only a small amount of fluid passes through port 10 of the cylinder 9 and piston rod 12 moves upwardly only a short distance pushing on tongue 15 and moving contacts 16 and 37 towards contact 28. Under these conditions wire 30 has to expand a considerable length before contacts 37 and 28 are actually in contact and contacts 16 and 37 separated thus causing a relatively slow flashing of said brake lamp.

However, if the brake pedal 1 is applied as for a complete stopping of the vehicle, that is, with maximum pressure on pedal 1, piston rod 12 will push tongue 15 so as to move contacts 37 and 28 so that they are only slightly spaced apart and thus wire 30 needs only to expand a very short distance to close contacts 37 and 28 or little contraction to break the contact providing a rapid flashing of said brake lights. Thus the amount of pressure applied to brake pedal 1 will proportionally vary the time of flash of the signal lights so that other drivers can determine the amount of braking being applied to the vehicle.

Whereas the above describes pressure applied to brake pedal 1 it is to be appreciated that other pressure responsive devices such as of a diaphragm type can be used instead of cylinder 6 or pressure from other moving devices than an operator can be used to move piston rod 5 or also fluid pressures other than that from a master cylinder such as for example, those in a steam boiler or other pressure containing apparatus can be admitted to port 10 to operate piston 11. Thus, the present device can be readily connected to and used with other devices than vehicle brake systems for signaling the pressure applied. Likewise other indicating means than lamps can be substituted for lamps 52, 54, and 56 such as electrically operated bells or the like as the signalling means.

I claim:

1. A pressure controlled device for producing variable flashing signals comprising a pair of superposed L-shaped electrically conductive members, electrical insulating means supporting said members spaced apart, a plate fixedly mounted at one end on one of said members, being of electrical conducting material, and having an inner opening and a tongue extending through said opening, said tongue carrying an electrical contact thereon, an electrical conducting resilient heat expansible plate fixedly connected at one end to said first plate, having an electrical contact on its other end above said first contact, a center opening and a leaf spring integral at one end with said resilient plate other end and fixedly connected to said first plate by the other end of said spring, a contact carried by the other of said L-shaped members above said first mentioned contact, an L-shaped lever having its base affixed to said resilient plate, an insulator carried by said lever, a heat expansible resistance wire connected to and stretched between said one of said L-shaped members and said insulator, a resistance wire electrically connected to said other of said L-shaped members and said first wire at said insulator, means operable by pressure for moving said tongue contact towards said second contact, means for supplying electrical current to said one of said L-shaped members and electric signalling means electrically connected to said other of said L-shaped members.

2. A pressure controlled device for producing variable flashing signals as claimed in claim 1 wherein said means for moving said tongue contact consists of a cylinder having a port, means for supplying pressure to said port, a piston slideable in said cylinder, a spring tending to hold said piston near said port, a piston rod and an electrical insulating member carried by said piston rod having said tongue in contact therewith.

3. A pressure controlled device for producing variable flashing signals as claimed in claim 2 wherein said means for supplying pressure consists of a hydraulic brake system having a master cylinder in communication with said port.

4. A pressure controlled device for producing variable flashing signals as claimed in claim 1 wherein said one of said L-shaped members has an opening therethrough, said pressure operable means being positioned beneath said opening, said first plate has said tongue extending through said opening contacting said pressure operable means therebeneath for at times moving said tongue contact and thereby said resilient plate contact towards the contact carried by the other of said L-shaped members when pressure is produced in said pressure operable means.

References Cited

UNITED STATES PATENTS

| 2,582,483 | 1/1952 | Hallerberg | 340—60 X |
| 2,748,218 | 5/1956 | Leichsenring | 340—81 X |
| 2,751,458 | 6/1956 | Kayuha | 340—71 X |
| 2,906,835 | 9/1959 | Schmidinger | 337—138 X |
| 3,090,851 | 5/1963 | Strauss et al. | 337—138 X |
| 3,153,125 | 10/1964 | Strauss et al. | 337—133 |

JOHN W. CALDWELL, Primary Examiner

KENNETH N. LEIMER, Assistant Examiner

U.S. Cl. X.R.

337—1, 138, 140; 340—72